US009663720B2

(12) United States Patent
Nousiainen et al.

(10) Patent No.: US 9,663,720 B2
(45) Date of Patent: May 30, 2017

(54) PROCESS FOR PRODUCING HYDROCARBONS

(71) Applicant: UPM-KYMMENE CORPORATION, Helsinki (FI)

(72) Inventors: Jaakko Nousiainen, Lappeenranta (FI); Teemu Lindberg, Lappeenranta (FI); Isto Eilos, Porvoo (FI); Heli Laumola, Helsinki (FI); Kati Vilonen, Kustavi (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 14/897,398

(22) PCT Filed: Jul. 11, 2014

(86) PCT No.: PCT/FI2014/050570
§ 371 (c)(1),
(2) Date: Dec. 10, 2015

(87) PCT Pub. No.: WO2015/004329
PCT Pub. Date: Jan. 15, 2015

(65) Prior Publication Data
US 2016/0130509 A1    May 12, 2016

(30) Foreign Application Priority Data
Jul. 12, 2013  (FI) ..................................... 20135770

(51) Int. Cl.
*C07C 1/00*  (2006.01)
*C10G 1/00*  (2006.01)
(Continued)

(52) U.S. Cl.
CPC ................. *C10G 3/50* (2013.01); *C10G 3/42* (2013.01); *C10G 3/45* (2013.01); *C10G 3/46* (2013.01);
(Continued)

(58) Field of Classification Search
CPC .................................... C07C 1/00; C10G 1/00
(Continued)

(56) References Cited

U.S. PATENT DOCUMENTS

2004/0230085 A1   11/2004   Jakkula et al.
2009/0250376 A1   10/2009   Brandvold et al.
(Continued)

FOREIGN PATENT DOCUMENTS

WO   2012069706 A2   5/2012
WO   2012143613 A1   10/2012

OTHER PUBLICATIONS

International Search Report mailed Sep. 29, 2014; International Application No. PCT/FI2014/050570; International Filing Date Jul. 11, 2014 (3 pages).
(Continued)

*Primary Examiner* — Thuan D Dang
(74) *Attorney, Agent, or Firm* — Cantor Colburn LLP

(57) ABSTRACT

The present invention relates to a process for converting feedstock comprising materials of biological origin into hydrocarbons, said process comprising the steps where a) feedstock comprising at least one material of biological origin is subjected to purification treatment to obtain purified feedstock, and b) the purified feedstock is subjected to hydroprocessing in the presence of at least one hydrodeoxygenation catalyst, at least one hydrodewaxing catalyst and at least one hydrodearomatization catalyst to obtain a hydroprocessing product.

33 Claims, 2 Drawing Sheets

(51) Int. Cl.
*C10G 3/00* (2006.01)
*C10G 45/44* (2006.01)
*C10G 45/46* (2006.01)
*C10G 45/58* (2006.01)
*C10G 45/60* (2006.01)
*C10G 65/08* (2006.01)
*C10G 65/12* (2006.01)
*C10G 65/00* (2006.01)

(52) U.S. Cl.
CPC ............... *C10G 3/47* (2013.01); *C10G 3/48* (2013.01); *C10G 3/49* (2013.01); *C10G 45/44* (2013.01); *C10G 45/46* (2013.01); *C10G 45/58* (2013.01); *C10G 45/60* (2013.01); *C10G 65/00* (2013.01); *C10G 65/08* (2013.01); *C10G 65/12* (2013.01); *Y02P 30/20* (2015.11)

(58) Field of Classification Search
USPC ................ 585/240, 241, 242, 310, 317, 326
See application file for complete search history.

(56) References Cited

U.S. PATENT DOCUMENTS

| | | |
|---|---|---|
| 2009/0283442 A1 | 11/2009 | McCall et al. |
| 2011/0099891 A1 | 5/2011 | Kaul et al. |
| 2011/0105812 A1 | 5/2011 | Marker et al. |
| 2012/0004479 A1 | 1/2012 | Hanks et al. |
| 2012/0260565 A1 | 10/2012 | Nousiainen et al. |
| 2013/0116491 A1 | 5/2013 | Dupassieux et al. |

OTHER PUBLICATIONS

Written Opinion mailed Sep. 29, 2014; International Application No. PCT/FI2014/050570; International Filing Date Jul. 11, 2014 (3 pages).

PROCESS FOR PRODUCING HYDROCARBONS

FIELD OF THE INVENTION

The present invention relates to converting of feedstock comprising material of biological origin into hydrocarbons useful as liquid fuels and fuel components, whereby the amount of aromatics in said hydrocarbons is decreased and/or maintained at a low level. The invention also relates to subjecting feedstock comprising material of biological origin to purification and catalytic treatment under conditions suitable for hydroprocessing to yield hydrocarbons useful as liquid fuels and fuel components.

BACKGROUND OF THE INVENTION

The demand for hydrocarbons useful as fuels and fuel components, originating from renewable sources increases worldwide. At the same time requirements with respect to the composition and quality of fuels and fuel components become more restricted. Particularly, legislation and standards concerning transportation fuels in many countries set limits for various components in said fuels. For example, the standard MK1 in Sweden requires that the diesel fuel on the Swedish market contains not more than 5% by weight of aromatic compounds.

Hydroprocessing is widely used for converting feedstock originating from renewable materials to hydrocarbons. However, the composition of the obtained hydrocarbon product varies and in many cases the aromatics content exceeds the limit of 5% by weight.

When renewable materials comprising substantial amounts of aromatics and/or cyclic structures containing unsaturated bonds are subjected to hydroprocessing, the content of said compounds in the feedstock and aromatizing—dearomatizing reaction equilibrium have an effect on the aromatics content in the final hydrocarbon product. Thus, in the field it has been regarded necessary to use feedstock having low content of aromatics and/or cyclic structures containing unsaturated bonds, for obtaining products meeting the tight requirements for aromatic contents.

Despite the ongoing research and development, there is still a need to provide improved processes and methods for converting feedstock originating from renewable materials to hydrocarbon products comprising low amounts of aromatics, in an efficient and economical way.

SUMMARY OF THE INVENTION

The present invention relates a process for converting feedstock comprising material of biological origin to hydrocarbons, whereby the amount of aromatics in said hydrocarbons is decreased and/or maintained at a low level.

Particularly the present invention relates to a process for converting feedstock comprising material of biological origin to hydrocarbons, wherein said feedstock is subjected to purification followed by hydroprocessing in the presence of at least one hydrodeoxygenation (HDO) catalyst, at least one hydrodewaxing (HDW) catalyst and at least one hydrodearomatizing (HDA) catalyst. Thus at least hydrodeoxygenation, hydrodewaxing and hydrodearomatizing are carried out. Suitably the hydrodearomatizing is carried out simultaneously and/or subsequently to the hydrodeoxygenation and hydrodewaxing.

Liquid fuels and fuel components comprising less than 5%, even less than 1% by weight of aromatic compounds may be obtained by the process of the invention.

Further, liquid fuels and fuel components having improved cetane rating may be obtained by the process of the invention.

Thus an object of the invention is to provide a process for effectively and economically converting feedstock comprising material of biological origin into hydrocarbons, whereby the amount of aromatics in said hydrocarbons is decreased and/or maintained at a low level.

Another object of the invention is to provide a process for effectively and economically converting feedstock comprising material of biological origin into hydrocarbons having improved cetane rating, suitable for use as liquid fuels and fuel components.

Still another object of the invention is to provide a process to alleviate the disadvantages of processes known in the art.

The objects of the invention are attained with the process of the invention.

Characteristic features of the process of the invention are stated in the claims.

DEFINITIONS

The term "hydroprocessing" refers here to catalytic processing of organic material by all means of molecular hydrogen.

The term "hydrotreatment" refers here to a catalytic process, which typically removes oxygen from organic oxygen compounds as water (hydrodeoxygenation, HDO), sulphur from organic sulphur compounds as dihydrogen sulphide (hydrodesulphurisation, HDS), nitrogen from organic nitrogen compounds as ammonia (hydrodenitrogenation, HDN) and halogens, for example chlorine from organic chloride compounds as hydrochloric acid (hydrodechlorination, HDCl), typically under the influence of catalysts.

The term "deoxygenation" refers here to the removal of oxygen from organic molecules, such as carboxylic acid derivatives, alcohols, ketones, aldehydes or ethers.

The term "hydrocracking" refers here to catalytic decomposition of organic hydrocarbon materials using molecular hydrogen at high pressures.

The term "hydrodewaxing" (HDW) refers here to catalytic treatment of organic hydrocarbon materials using molecular hydrogen at high pressures to alter the structure of high molecular weight hydrocarbons by hydroisomerization, hydrodeoxygenation, hydrodearomatization and/or hydrocracking.

The term "hydrodearomatization" (HDA) refers here to catalytic treatment of organic hydrocarbon materials using molecular hydrogen at high pressures for converting aromatic compound to non-aromatic compounds.

The term "hydrogenation" means here saturation of carbon-carbon double bonds by means of molecular hydrogen under the influence of a catalyst.

The term "neutral components" or "neutral fraction" or "neutral materials", often also referred to as "unsaponifiables" refers here to all neutral organic components in heavy fractions or residues obtained in treating or processing material of biological origin. Examples of said materials are tall oil pitch and tall oil materials. Examples of neutral components contained for example in tall oil pitch include sterols, stanols, sterol and stanol esters, polymeric acids, polymeric neutral substances, dimers, trimers, lignin derivatives, resin acids and fatty acids and esters thereof. Transportation fuels refer to fractions or cuts or blends of hydrocarbons having distillation curves standardized for fuels, such as for diesel fuel (middle distillate from 160 to 380° C., EN 590), gasoline (ambient—210° C., EN 228), aviation fuel (160 to 300° C., ASTM D-1655 jet fuel), kerosene, naphtha, etc.

DETAILED DESCRIPTION OF THE INVENTION

Figure 1:
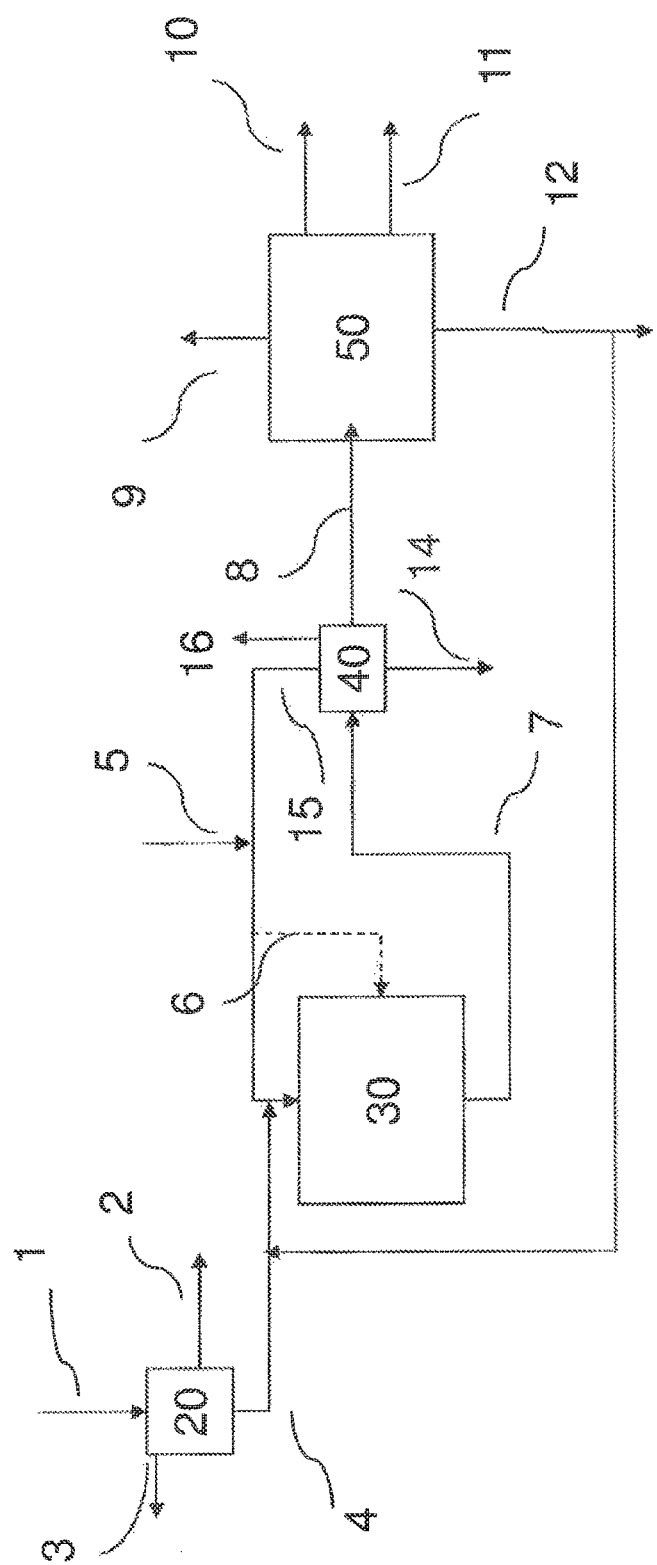
FIG. 1 is a schematic flow diagram representing one embodiment of the process where a feedstock is subjected to purification, followed by pretreatment with guard bed/guard beds and HDO/HDW/HDA treatment in a hydroprocessing reactor system, separating hydrogen for recycling, and obtaining a liquid product, which is subjected to fractionation.

It was surprisingly found that a feedstock comprising material of biological origin, containing even high amounts of aromatic compounds and/or cyclic structures containing unsaturated bonds can be converted in an efficient manner to hydrocarbons comprising low amounts of aromatics, with a process where said feedstock is subjected to purification followed by hydroprocessing under conditions suitable for hydrodexygation, hydrodewaxing and dearomatization.

Materials of biological origin refer here to renewable materials.

According to one embodiment of the present invention the material of biological origin is selected from the group consisting of
a) any kind of fats, oils and waxes of biological origin, derived from or obtained from plants, animals, fish, insects and microbes including plant fats, plant oils, plant waxes; animal fats, animal oils, animal waxes, fish fats, fish oils, fish waxes;
b) fatty acids, free fatty acids and resin acids derived from or obtained from plants, animals, fish, insects and microbes, for example from plant fats, plant oils, plant waxes; animal fats, animal oils, animal waxes; fish fats, fish oils, fish waxes, and from mixtures thereof by hydrolysis, transesterification or pyrolysis;
c) esters obtained from plant fats, plant oils, plant waxes; animal fats, animal oils, animal waxes; fish fats, fish oils, fish waxes, and mixtures thereof by transesterification;
d) metal salts of fatty acids obtained from plant fats, plant oils, plant waxes; animal fats, animal oils, animal waxes; fish fats, fish oils, fish waxes, and mixtures thereof by saponification;
e) anhydrides of fatty acids from plant fats, plant oils, plant waxes; animal fats, animal oils, animal waxes; fish fats, fish oils, fish waxes, and mixtures thereof;
vi) esters obtained by esterification of free fatty acids of plant, animal and fish origin with alcohols;
f) fatty alcohols and aldehydes obtained as reduction products of fatty acids from plant fats, plant oils, plant waxes; animal fats, animal oils, animal waxes; fish fats, fish oils, fish waxes, and mixtures thereof;
g) recycled food grade fats and oils; and fats, oils and waxes obtained by genetic engineering;
h) dicarboxylic acids and polyols including diols, hydroxyketones, hydroxyaldehydes, hydroxycarboxylic acids, and corresponding di- and multifunctional sulphur compounds, corresponding di- and multifunctional nitrogen compounds;
i) compounds obtained with the action of microorganisms including algae;
j) terpene-based compounds obtained from plants, terpene oils, distillation bottoms from terpene distillation and flavorants and/or fragrance industry;
k) pyrolyzed wood including hydropyrolyzed wood, Fischer-Tropsch wax;
l) pyrolysis oils from any pyrolysis process, and lignin and lignin derived compounds;
m) bio-oils obtained from super-critical treatment, and
n) mixtures of said materials of biological origin.

The material of biological origin is suitably selected from a group consisting of
a) fats, oils, and waxes derived from or obtained from plants; animal fats, animal oils, animal waxes, fish fats, fish oils, fish waxes;
b) recycled food grade fats and oils, and fats, oils and waxes obtained by genetic engineering, and sewage sludge;
c) fats, oils and waxes derived from or obtained with the action of algae, molds, yeasts, fungi and/or other microorganisms capable of producing said compounds;
d) pyrolysis oils, lignin and lignin-derived compounds;
e) resins, resin acids, fatty acids, sterols and stanols obtained from plants, bio-oils including pyrolysis oils; and
f) mixtures of said materials of biological origin.

According to one embodiment of the present invention the material of biological origin is selected from the group consisting of fish oils such as Baltic herring oil, salmon oil, herring oil, tuna oil, anchovy oil, sardine oil, and mackerel oil; plant oils such as rapeseed oil, colza oil, canola oil, tall oil, crude tall oil, sunflower seed oil, soybean oil, corn oil, hemp oil, linen seed oil, olive oil, cottonseed oil, mustard oil, palm oil, peanut oil, castor oil, Jatropha seed oil, Pongamia pinnata seed oil, palm kernel oil, cuphea oil, camelina oil, curcas oil, babassu oil, palm kernel oil, crambe oil and coconut oil; animal fats such as lard, tallow, rendered lard and rendered tallow; waste and recycled food grade fats and oils; fats, waxes and oils produced by genetic engineering; animal waxes such as bee wax, Chinese wax (insect wax), shellac wax, and lanoline (wool wax); plant waxes such as carnauba palm wax, Ouricouri palm wax, jojoba seed oil, candelilla wax, esparto wax, Japan wax, rice bran oil; and terpenes, terpineols, triglycerides, pyrolysis oils, lignin and lignin-derived compounds; and any mixtures thereof.

In one embodiment of the invention, the material of biological origin comprises non-edible plant-derived compounds, plant oils or components thereof or derivatives thereof, pyrolysis oils, lignin, lignin derivatives and combinations thereof, obtained for example as by-products from the forest industry.

In one embodiment of the invention, the material of biological origin comprises tall oil materials. Tall oil material comprises one or more of tall oil components, tall oil derivatives and any combinations thereof, including tall oil, crude tall oil (CTO), tall oil fatty acids (TOFA), tall oil soap etc. Tall oil or CTO refers to processed mixtures of naturally-occurring compounds extracted from wood species, such as birch, pine, spruce and aspen and the like.

Tall oil or CTO is a major by-product of the Kraft sulphate pulping process. In the Kraft pulping process rosin and fatty acids, which occur for example in coniferous wood as free acids or their esters, are saponified by cooking liquor to their corresponding sodium salts. These salts, or their soaps, along with some neutral components are dissolved or suspended in the spent cooking liquor (Black Liquor). This liquor is later concentrated and the soaps and neutral components are separated as tall oil soap skimming. Most Kraft mills which process softwood recover tall oil soap. This soap is usually acidified to produce crude tall oil. The handling and cooking of the wood causes break down of the triglyceride structures and hence tall oil or CTO does not contain any significant amounts of triglycerides. The composition of tall oil or CTO varies depending on the specific wood species.

Tall oil or CTO refers to a mixture of fatty acids, resin acids, neutral components and turpentine components originating from wood, such as coniferous wood. The turpentine components of tall oil are substantially composed of $C_{10}H_{16}$ terpenes. Tall oil is mainly composed of saturated and unsaturated oxygen-containing organic compounds such as rosins, unsaponifiables, sterols, resin acids (mainly abietic acid and its isomers), fatty acids (mainly linoleic acid, palmitic acid, oleic acid and linolenic acid), fatty alcohols, sterols, other alkyl hydrocarbon derivatives, as well as inorganic impurities (alkaline metal compounds, sulphur, silicon, phosphorus, calcium and iron compounds). Tall oil also covers soap oil.

Tall oil materials contain significant amounts of aromatic compounds and/or cyclic structures containing unsaturated bonds. CTO contains typically around 25 w-% or more of aromatic compounds and/or cyclic structures containing unsaturated bonds.

Pyrolysis oils typically contain about 25-40 w-% of aromatic compounds and/or cyclic structures containing unsaturated bonds, depending on the raw materials, process conditions and steps carried out after the pyrolysis process.

Lignin and lignin derivatives are heteropolymers comprising different phenolic units, and they typically have high content of aromatic compounds and/or cyclic structures containing unsaturated bonds, depending on the depolymerization treatment and other chemical treatment. Solubilized lignins have a content of aromatics and/or cyclic structures containing unsaturated bonds typically clearly more than 50 w-%.

Biological materials and bio-oils, subjected to supercritical treatment etc. processing may have even higher aromatics contents. However, it is evident that the composition of said materials may vary depending on the process conditions and starting materials.

Animal fats, fats obtained with the action of algae and fish oils typically contain triglycerides, less than 3 w-% of unsaponifiables and about 1-2 w-% of aromatic compounds.

Plant oils are typically composed of triglycerides and/or fatty acids and they contain about 1-2 w-% of aromatic compounds and less than 3 w-% of compounds comprising an aromatic part in their structure.

F-T waxes typically contain no aromatic compounds or cyclic structures containing unsaturated bonds.

According to one embodiment of the invention the feedstock may also comprise mixtures or co-feeds of biological origin and fossil fuel derived hydrocarbons. Suitable co-feed components in combination with the above listed materials of biological origin, include any fossil fuel derived hydrocarbons or cuts of them, spent motor oil and industrial lubricants, used paraffin waxes, liquids derived from gasification of coal, biomass, or natural gas followed by a downstream liquefaction step such as Fischer-Tropsch technology; liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. One advantage of using a co-feed component is the transformation of what has been considered to be a waste product from a fossil fuel based or other process into a valuable co-feed component to the current process.

In the process of present invention particularly materials of biological origin with high content of aromatic compounds and/or cyclic structures containing unsaturated bonds, optionally with co-feeds can be used. Hydrocarbon products with low content of aromatics and improved cetane ratings may be obtained. The cetane rating (cetane number) of the hydrocarbon product or fraction thereof may suitably be 60 or higher.

The process for converting feedstock comprising materials of biological origin to hydrocarbons comprises the steps where feedstock comprising at least one material of biological origin is subjected to purification treatment to obtain purified feedstock, the purified feedstock is subjected to hydroprocessing in the presence of at least one hydrodeoxygantion (HDO) catalyst, at least one hydrodewaxing (HDW) catalyst and at least one hydrodearomatization (HDA) catalyst to obtain a hydroprocessing product.

Suitably the hydrodearomatization is carried out simultaneously or subsequently to hydrodeoxygenation and hydrodewaxing.

Purification

The feedstock comprising material of biological origin is subjected to at least one purification treatment prior to hydroprocessing. In the purification treatment the feedstock is fed to a purification unit, where the purification treatment is carried out. In the purification unit at least one purification step is carried out. The purification step is selected from filtration, degumming, bleaching, solvent extraction, hydrolysis, ion-exchange resin treatment, mild acid wash, evaporative treatment, and any combination thereof. The purification steps may be same or different. The purification unit comprises necessary equipment for carrying out the purification step or steps. The purification unit may comprise one or more pieces of the same of different purification equipment, and when more than one pieces of equipment are used they are suitably arranged in series.

Suitably the purification treatment is selected from one or more of evaporation, bleaching and degumming and combinations thereof.

According to one embodiment degumming may be used as a purification step, particularly for the removal of metal complexes. Degumming may be performed by washing the material of biological origin suitably at 90-105° C., 300-500 kPa, with an acid, such as $H_3PO_4$, followed by treating with a base, such as NaOH and soft water and separating the formed gums. A major amount of metal components can be removed during this degumming step.

According to another embodiment bleaching may be used as a purification step. In the bleaching the material of biological origin can be heated and mixed with natural or acid-activated bleaching clay. Bleaching can remove various impurity traces and reduce the oxidation tendency. Bleaching can be carried out under vacuum to minimize possible oxidation.

According to one suitable embodiment the purification treatment is carried out as evaporative treatment. The evaporative treatment carried out in a purification unit comprising at least one evaporator, suitably three or four evaporators. In the evaporative treatment the feedstock is fed in a purification unit comprising at least one evaporator, where the feedstock is evaporated to provide purified feedstock.

The purification unit may comprise one, suitably at least two, particularly suitably three or four or more evaporators, where the feedstock comprising material of biological origin is subjected to evaporative treatment to obtain the purified feed stock.

If desired the purified feedstock, obtained suitably as preheated from an evaporator may be subjected to steam stripping in a stripping unit for further removal of volatiles.

In an embodiment a series of two or more evaporators, at elevated temperatures and reduced pressures may be used. The evaporation performed in more than one step, suitably in more than one evaporators, takes place in a more controlled manner. The multi-step evaporation also makes it possible to accomplish the evaporation in such a manner that the amount of residue removed by the purification is very small.

By evaporation is meant here any suitable separation method for separating two or more components from each other, such as gases from liquid, which separation method is based on utilizing the differences in the vapor pressure of the components. Examples of such separation methods are evaporation, flashing and distillation.

The evaporation unit may comprise one or more flashing systems, heaters and/or evaporators.

Said flashing system comprises a heat exchanger, typically heated up to temperatures of about 200° C., and an expansion vessel operated typically under moderate vacuum of about 200-900 mbar (abs), where components which are volatile at the present conditions are released and can be separated.

Examples of particularly suitable evaporation methods are those using thin film evaporation technology. The evaporators can thus be selected from thin film evaporators, falling film evaporators, short path evaporators, plate molecular stills and any other evaporators using thin film evaporation technology. The purification unit can comprise one, two, three, four or more evaporators which can be either of the same type or different type and are selected independently from the suitable separation methods presented above. The first evaporator may also be a flashing system or a heater system described below in connection with the heater evaporator combination. The evaporative treatment is suitably carried out in an evaporation unit comprising evaporators arranged in series.

Water, metals and solids, compounds comprising for example metals, Na, Fe, P, Si, sulfates, such as $Na_2SO_4$, and $H_2SO_4$ may be removed in the evaporative treatment.

According to one embodiment of the invention the evaporation is performed by using a heater system and evaporator combination. In this embodiment, the feedstock is first heated up under vacuum in a heater system to yield a gas phase and liquid phase. A suitable temperature is 150-230° C., at a pressure of 40-80 mbar (abs). The gas phase containing volatile and light components and water is separated. The liquid phase is directed to an evaporator for further purification, suitably to an evaporator described as the second evaporator in the following two evaporator embodiment. The heater system may be any heating equipment suitable for heating and separation of volatile and light components.

According to another embodiment, the evaporation is performed by using two evaporators where the purification unit comprises a first and a second evaporator. In this embodiment, the first evaporator is suitably a thin film evaporator. Suitably the first evaporator operates at a temperature of 150-200° C., and a pressure of 10-20 mbar (abs). The gas phase containing volatile and light components and water is separated. The liquid fraction from the first evaporator is led to the second evaporator. A thin film evaporator or plate molecular still can be used as the second evaporator. The second evaporator typically operates at a temperature of 300-390° C. and a pressure of 0.01-15 mbar (abs). The distillate, i.e. purified feedstock is fed to the subsequent process step.

According to still another embodiment, the evaporation is performed by using three evaporators, i.e. the purification unit comprises a first evaporator, a second evaporator and a third evaporator. Water and light components are evaporated from the feedstock in the first evaporator in order to make the following evaporation steps more efficient. In the second and third evaporators the residual fraction containing pitch/heavy components is minimized by evaporating the liquid product from the first evaporator. The advantage of using three-step evaporation is that the second evaporator can be a small and cheap evaporator that removes light components from the material. The following third evaporator can also be smaller and cheaper than the second evaporator in the two-step evaporation. In this three-step evaporation the heavy fraction from the second evaporator is directed to the third evaporator, from which the heavy evaporation residue containing mainly heavy polymeric components and pitch may be used as starting material in other processes and the effluent, typically containing mainly fatty acids, is obtained as the purified feedstock, which is directed to the subsequent process step. In the embodiment of the invention, where the evaporation is performed in three steps, the feedstock comprising at least one material of biological origin is fed to a purification unit comprising a first evaporator, a second evaporator and a third evaporator. In the first step, water and light components are removed at a temperature of 50-250° C. and a pressure of 5-100 mbar (abs), suitably at a temperature of 120-200° C. and a pressure of 10-55 mbar (abs). The first evaporator is suitably a thin film evaporator or a falling film evaporator. In the second step the liquid product from the first evaporator is evaporated at a temperature of 180-350° C. and a pressure of 0.1-40 mbar (abs), suitably at a temperature of 200-270° C. and a pressure of 0.1-20 mbar (abs). The second evaporator is suitably a plate molecular still or a thin film evaporator. Particularly suitably the second evaporator is a thin film evaporator. The liquid product (effluent) from the second evaporator is recovered and the residual fraction from the second evaporator is directed to a third evaporator. In the third evaporator the residual fraction from the second evaporator is evaporated at a temperature of 200-450° C. and a pressure of 0-50 mbar (abs), suitably at a temperature of 300-390° C. and a pressure of 0.01-10 mbar (abs). The third evaporator is suitably a short path evaporator or a thin film evaporator. The effluent recovered from the third evaporator is combined with the effluent of the second evaporator to form the purified feedstock. The purified feedstock may be directed to the subsequent process step.

According to still another embodiment of the invention, the evaporation is performed in four steps by feeding the feedstock comprising at least one material of biological origin to a purification unit comprising a first evaporator, a second evaporator, a third evaporator and a fourth evaporator. In the four-step evaporation the feedstock is evaporated in the first evaporator to produce a first fraction comprising water and light components, and a second fraction comprising heavier components and residues. The second fraction is evaporated in the second evaporator to produce a third fraction comprising water and low boiling light compounds and a fourth fraction comprising heavier components and residues. The fourth fraction is evaporated in the third evaporator to produce a fifth fraction comprising liquid components, typically mainly fatty acids and a sixth fraction comprising heavier components and residues. The sixth fraction is evaporated in the fourth evaporator to produce a seventh fraction comprising liquid components, typically mainly fatty acids and an eighth fraction comprising heavy evaporation residue. The fifth and seventh fractions are combined and recovered as the purified feedstock, which may be directed to the subsequent process step.

In the four step evaporation the first evaporator may be a falling film evaporator (falling film tube evaporator) or a plate molecular still or a thin film evaporator, suitably a falling film evaporator or plate molecular still is used, particularly suitably a falling film evaporator is used. The feedstock is evaporated in the first evaporator at the temperature from 80 to 150° C., suitably from 90 to 120° C. The evaporation is carried out under a pressure from 40 to 80 mbar (abs), suitably from 45 to 65 mbar (abs). A first fraction comprising water and some light components is separated and the second fraction comprising the heavier components and residues, such as fatty acids, resin acids, neutral substances etc., is directed to the second evaporator. The falling film evaporator removes effectively a major amount of water present in the feed material, typically more than 50% by weight.

The second evaporator is a thin film evaporator or a short-path evaporator or a plate molecular still, suitably a thin film evaporator is used. The second evaporator operates at a temperature from 180 to 250° C., suitably from 190 to 220° C. A pressure of 40 to 80 mbar (abs), suitably from 45 to 65 mbar (abs) is used. A third fraction containing water and low boiling light hydrocarbon components, said fraction typically having boiling point of 100-210° C., suitably 100-170° C. at a normal pressure, is removed and the liquid fourth fraction is directed to the third evaporator. When CTO is used as material of biological origin, crude sulfate turpentine (CST) is removed in the third fraction with water. Particularly suitably the first and second evaporators are operated under the same pressure. Suitably the same pressure vessel or pressure line is used.

The liquid fraction from the second evaporator is fed to the third evaporator. A thin film evaporator or plate molecular still or short path evaporator can be used, suitably the third evaporator is a short path evaporator. The third evaporator typically operates at a temperature of 200 to 350° C., suitably from 250 to 300° C. A pressure of 0.01 to 50 mbar (abs), suitably 0.5 to 10 mbar (abs), more suitably 1 to 5 mbar (abs) and particularly 2 to 3 mbar (abs) is used in the third evaporator. A fifth fraction (distillate) (comprising typically mainly or more than 50% by weight of fatty acids when CTO is used as feedstock) is separated and suitably fed to a reactor feed tank and the sixth fraction (liquid phase) is led to the fourth evaporator.

The fourth evaporator may be a short path evaporator or a plate molecular still, suitably a short path evaporator is used. Typical operating conditions include a temperature of 250 to 400° C., suitably from 290 to 360° C. A pressure of 0.01 to 10 mbar (abs), suitably 0.01 to 5 mbar (abs), more suitably 0.1 to 2 mbar (abs) is used. From the fourth evaporator, the seventh fraction (distillate) is obtained and combined with the distillate fraction obtained from the third evaporator to yield purified feedstock, which may be directed to the subsequent process step. The eighth fraction comprises the heavy evaporation residue, which is a very viscous fraction, amounting typically about 5% from the original feed.

An advantage of the purifying treatment carried out with a three or four or more step evaporation is that the boiling takes place in a more controlled manner because low boiling light components, i.e. components having boiling point of 150-210° C., suitably 150-170° C., under normal pressure, do not cause so much "carry over", i.e. migrating of the compounds having a boiling point range at the higher end of the above boiling point ranges as well as impurities to the vapor in the subsequent evaporation step. Light components separated in the purification treatment may be, if desired, be directed to the hydroprocessing step.

Pretreatment

Between the purification treatment and hydroprocessing there may be an additional optional pretreatment, which may be carried out using super-critical extraction technology or with one or more guard beds. The purified feedstock is subjected to pretreatment to yield pretreated feedstock. Suitably the pretreatment is carried out as guard bed treatment.

Said guard bed treatment may be realized by a separate pretreatment bed(s) prior to the hydroprocessing, or by a pretreatment bed(s) or section located in connection with the hydropocessing reactor or reactor system. Guard beds remove effectively impurities, particularly compounds comprising metals and phosphorus from the feedstock. The purpose of the guard bed treatment is to act against harmful substances in the feed, and to protect the hydroprocessing catalysts from poisoning and fouling. The guard bed treatment also prolongs the active operating time of the hydroprocessing catalysts. Further, typically some hydrogenation takes place in the guard beds. The process of the present invention optionally comprises subjecting of the purified feedstock to treatment in one or more guard beds. The one or more guard beds can be arranged either to separate guard bed unit(s) and/or in the hydroprocessing reactor or reactor system. There are preferably two or more guard beds in series in the hydroprocessing reactor system. The guard bed(s) may be combined in the same pressure vessel as the hydroprocessing catalyst beds or they may be provided in separate pressure vessel(s).

There are basically two types of guard beds, i.e. active and inactive guard beds. The active guard beds take part in the purification of the feed and in changing the chemical composition of the feed and they can be placed either in separate guard bed unit(s) or inside the hydroprocessing reactor itself. The guard bed comprises typically material selected from activated gamma aluminum oxide only or a commercially available purifying catalyst.

The guard bed or guard beds or the guard bed units can retain both solid and solvated impurities of the feed material, such as silicon based anti-foaming agents originating from tall oil processing and harmful chemical components. The guard bed(s) and/or the guard bed units can be heated, unheated, pressurized or unpressurised, fed with hydrogen gas or without hydrogen gas. Suitably the guard bed(s) and/or the guard bed units are heated and unpressurised.

The guard bed material may also comprise catalyst materials that are capable of catalyzing hydroprocessing reactions. The catalyst material may comprise the same material/materials that are used in the hydroprocessing reactor(s). The catalytic activity of the guard bed catalysts is typically lower than that of the hydroprocessing catalyst. A catalyst or a combination of catalysts in a guard bed(s) may protect the main phase catalysts by removing metals, sulphur, phosphorus, etc. from the feed.

The activity of guard beds may be adjusted according to the composition of each feed stock.

The guard beds and/or the hydroprocessing catalyst beds may comprise an inert layer at the inlet ends of the reactors and also between the catalyst beds. Examples of inert media include glass spheres and silica.

The inactive guard beds merely take part in the purification of the feed. These guard beds comprise suitable passive or inert materials. The separate guard beds can be multiplied, meaning that there are one or several guard beds in a stand-by mode in parallel or in series with the guard bed(s) in use.

Hydroprocessing

The process of the present invention comprises hydroprocessing of the purified and optionally pretreated feedstock in the presence of least one hydrodeoxygenation (HDO) catalyst, at least one hydrodewaxing (HDW) catalyst and at least one hydrodearomatization (HDA) catalyst, to obtain a hydroprocessing product. The hydroprocessing product comprises hydrocarbons suitable as liquid fuel or fuel components and it may be fractionated into desired cuts.

The hydroprocessing in the process of the present invention can be carried out in one, or more steps.

Said hydroprocessing comprises feeding of the purified feedstock into a reactor system wherein said purified feedstock is contacted with at least one hydrodeoxygenation (HDO) catalyst, at least one hydrodewaxing (HDW) catalyst and at least one hydrodearomatization (HDA) catalyst, treating the purified feedstock catalytically with hydrogen in the reactor system to cause hydrodeoxygenation, hydrogenation, hydroisomerisation, hydrocracking and hydroaromatization of components contained in the purified feedstock to provide a hydroprocessing product.

The hydroprocessing reaction phase refers to the main reaction phase of the process. Said main reaction phase comprises at least one catalytically active reaction phase. The hydroprocessing reactor system may comprise one or more reactors, in one pressure vessel or in more than one pressure vessels.

In the process of the invention a variety of hydrogen promoted (hydroprocessing) reactions take place on the catalysts. These reactions are necessary for converting the biological feed into acceptable fuel or fuel components.

According to one embodiment of the present invention the hydroprocessing is carried out in one step. Suitably said hydroprocessing is carried out in one pressure vessel.

According to another embodiment of the present invention the hydroprocessing is carried out in two steps.

According to one embodiment where the hydroprocessing is carried out in one step the main reaction phase comprises at least two catalyst beds, where the first catalyst bed comprises a combination of active HDO and HDW catalysts, and the second catalyst bed comprises active HDA catalyst(s). According to another embodiment, the main reaction phase comprises three or more catalyst beds, where the first catalyst bed(s) comprises combination of active HDO and HDW catalysts, the second catalyst bed(s) comprises active HDW catalyst(s) and the third catalyst bed(s) comprises active HDA catalyst(s) in. According to another embodiment the HDO, HDW and HDA catalysts are located each in separate catalysts beds. According to still another embodiment the HDA catalyst bed may also contain HDW catalyst.

The catalyst beds typically operate in series. It is also possible to have catalyst beds operating in parallel.

In an embodiment of the invention the proportion of HDW catalyst grows from the first catalyst bed to the last catalyst bed containing the HDW catalyst, in the direction towards the outlet end of the reactor system.

According to one embodiment the proportion of the HDW catalyst grows in the catalyst beds containing HDO catalyst and the HDA catalyst beds contain no HDW catalyst.

In an embodiment of the invention the purified and optionally pretreated feedstock is heated and passed through the catalyst beds of the reactor system in series as a continuous flow without outlets for byproducts or other side streams.

In another embodiment the purified and optionally pretreated feedstock is heated and passed through the catalyst beds of the reactor system arranged in series as a continuous process, the system being equipped with outlets for byproducts and other side streams.

The catalyst beds may be provided in one pressure vessel. In an embodiment of the invention the catalyst beds are split among several pressure vessels and/or reactors.

In an embodiment of the invention the HDA catalyst is located in a separate catalyst bed(s) or in a separate vessel or reactor, where the process conditions can be adjusted according to the catalyst and feed properties.

The treatment of the feed material with hydrogen, i.e. the hydroprocessing provides a mixture of gaseous and liquid hydrocarbons, water and some mostly gaseous by-products, such as $H_2S$, CO and $CO_2$.

The process of the invention may be operated in a reactor system, which comprises at least one catalytically active pretreatment phase and at least one catalytically active main reaction phase. The two phases may be physically combined into one unit. Suitably said main reaction phase comprises a catalyst bed, wherein hydrodeoxygenating (HDO) and hydrodewaxing (HDW) catalysts are combined with each other, a catalyst bed comprising at least one hydrodewaxing (HDW) catalyst, and a catalyst bed, comprising at least one hydrodearomatiation (HDA) catalyst. In a two-step hydrogenation the HDA catalyst is located in the second hydroprocessing reactor/reactor system, which may optionally comprise HDW catalyst too.

The active HDO and HDW catalysts may be combined by being mixed with each other or they may be provided in separate layers or compartments within the same catalyst bed. The mixed catalysts may be provided by physically mixing different catalyst particles. The active catalytic components may also be combined during production of the catalyst, e.g. by being added onto the same support material(s). The catalyst layers may be provided by layering during packing of the bed. The HDA and HDW catalysts may be combined in a similar manner.

The combination of the catalysts need not be uniform. Thus, a catalyst bed may contain more of the HDO or more of the HDW catalyst(s) in the flow direction. There may be different types of HDO catalysts and/or HDW catalysts in a bed. Similarly, there may be several layers of the various catalysts in a catalyst bed and the layers need not be of equal size. For example, when catalyst particles having different shapes and sizes are used, it may be advantageous to pack the catalysts into the bed in a graded manner to influence the operating pressure and temperature properties of the reactor. The HDA and HDW catalysts may be arranged in a similar manner.

In the present invention, the HDO catalyst can be any HDO catalyst known in the art for the removal of hetero atoms (O, S, N) from organic compounds. In an embodiment of the invention, the HDO catalyst is selected from a group consisting of NiMo, CoMo, and a mixture of Ni, Mo and Co. A NiMo catalyst has proven very efficient in the process of the invention. The support for the HDO catalyst can be any oxide which is typically used in the art as support for HDO catalysts. The support is typically selected from $Al_2O_3$, $SiO_2$, $ZrO_2$, and mixtures thereof.

In an embodiment of the invention, suitably solid particles of $NiMo/Al_2O_3$ or, $NiMo/SiO_2$ are used. In another embodiment $CoMo/Al_2O_3$, or $CoMo/SiO_2$ is used. In a further embodiment $NiMoCo/Al_2O_3$ or, $NiMoCo/SiO_2$ is used. It is also possible to use a combination of HDO catalysts. The HDO catalyst(s) is/are sulphided prior to start up. Adequate sulphidation during operation is usually provided by organic sulphur compounds contained in the feed material.

The HDW catalyst is capable of at least hydrodeoxygenating, hydrogenating, isomerising, ring opening and cracking the purified feedstock to form a mixture of hydrocarbons. In this embodiment, the catalyst is selected so, that it hydrogenates the double bonds of the purified and optionally pretreated feedstock fed to the hydroprocessing. The catalyst removes heteroatoms of the feed molecules, especially oxygen, by hydrogenation. The catalyst has a capability of hydrogenating the olefinic bonds of the compounds in the feed, opening at least one of the bicyclic rings, and cracking the side chains of hydrocarbon chains. In other words, hydrocarbons are hydrogenated, isomerized and/or cracked in a single step. The cracking/isomerizing are controlled by process variables, such as pressure and/or temperature and by the properties of the catalyst, for example by controlling its acidity. At the same time sulfur compounds are reduced to hydrogen sulphide.

The HDW catalyst is selected from catalysts containing metals from group VI and/or VIII of the Periodic System or mixtures or combinations thereof, which catalyst is capable of converting biological feed material to fuel components in a single step. Aluminosilicate molecular sieves and especially zeolites with medium or large pore sizes are also useful as HDW catalysts in the present invention. Typical commercial zeolites useful in the invention include for instance ZSM-5, ZSM-11, ZSM-12, ZSM 22, ZSM-23 and ZSM 35. Other useful zeolites are zeolite beta and zeolite Y.

The HDW catalyst is also supported on an oxide support. The support materials may be the same as or different from those of the HDO catalyst. In an embodiment of the invention the HDW catalyst is selected from $NiW/Al_2O_3$ and $NiW/zeolite/Al_2O_3$. These HDW catalysts are especially well suited for combining with the HDO catalyst of the invention since they also require sulphiding for proper catalytic activity.

In one embodiment of the invention, the catalyst comprises NiW, typically on a support selected from $Al_2O_3$, zeolite, zeolite-$Al_2O_3$, and $Al_2O_3$—$SiO_2$. In a further suitable embodiment of the invention, the catalyst comprises NiW on an $Al_2O_3$ support.

In one embodiment, a catalyst bed of the main reaction phase of the reactor system comprises a combination of sulphided HDO and HDW catalysts, suitably a mixture or a combination of a NiW catalyst with a further catalyst. Said further catalyst may be selected from any catalysts containing metals from group VI and/or VIII of the Periodic System, such as Ni, Co, Mo, Pt, Pd, or mixtures or combinations thereof, such as NiMo and CoMo, typically on a support selected from $Al_2O_3$, zeolite, zeolite-$Al_2O_3$ or $Al_2O_3$—$SiO_2$. In a preferred embodiment, the further catalyst is NiMo on an $Al_2O_3$ support. In one suitable embodiment of the invention, the catalyst is a combination or a mixture or a combination of several thin layers or beds of NiMo and NiW catalysts.

In one suitable embodiment the HDO catalyst is $NiMo/Al_2O_3$ and the HDW catalyst is $NiW/zeolite/Al_2O_3$. The $NiMo/Al_2O_3$ catalyst mainly serves the purpose of hydrogenation, hydrodeoxygenation, hydrodesulphurization and hydrodenitrification. The $NiW/zeolite/Al_2O_3$ catalyst mainly serves the purpose of hydroisomerisation, hydrogenation, hydrodearomatization, and hydrocracking. However, as mentioned above, NiW has the capacity also for some hydrodeoxygenation, hydrodesulphurisation and hydrodenitrification of the biological raw material. The capability of opening of the fused ring structures is also a desired property of the catalysts.

In the present invention, the HDA catalyst is selected from sulphur tolerant dearomatization catalysts and sulphur tolerant isomerization catalysts and their combinations.

The HDA catalyst is selected from catalysts containing metals of the Group VIII of the Periodic table of Elements, Group VIB and the rare earth metals, which catalyst is capable of dearomatizing the feed material. Suitably the metal is selected from Pt, Pd, Ir, Ru, Rh, Re, Ni, Co, Mo, W, CoMo, NiMo or NiW, in elemental, oxide or sulphide form, and mixtures and combinations thereof.

Suitably said catalyst comprises a support selected from oxide supports, such as alumina, titania, silica, magnesia, zirconia, and $B_2O_3$, and other supports, such as carbon, charcoal, zeolites, and combinations thereof, suitably $Al_2O_3$, $Al_2O_3$—$SiO_2$, zeolite Y, $Al_2O_3$—$B_2O_3$, or $SiO_2$ and combination thereof. The catalyst may be promoted (or acid promoted) by for example fluorine, fluoro-sulfonic acid, trifluorimethanesulfonic acid or hydrogen fluoride as a Bronsted acid, or Friedel-Crafts catalyst selected from the group consisting of boron fluorides, tantalum fluorides and niobium fluorides, for increasing the acidity of the support whereby sulphur tolerance of the catalyst is improved.

Examples of suitable sulphur tolerant catalysts, in addition to all metal sulphides are Pd and/or Pt on zeolite $Y/Al_2O_3$, optionally with added Na; Pd and/or Pt on zirconia/silica, optionally with added alumina or alumina-silica; Pd and/or Pt on alumina/alumina-silica, optionally with one or more of titania, silica, magnesia, zirconia; Pd or Pt or Ir on carbon, or charcoal, suitably Pd promoted with tantalum perfluoride and hydrogen fluoride; Pd, Pt, Ir, Ru, Rh and/or Re on silca/alumina, sulphidized CoMo and NiMo catalysts on alumina/alumina-silica; and Pd—Pt on $Al_2O_3$—$B_2O_3$. By using suitable modified supports the HDA catalyst containing noble metals, such as Pd, Pt, Ir, Ru, Rh and/or Re, can maintain their activity even in sulphur containing process conditions.

According to one embodiment of the invention the hydroprocessing is carried out in one step, where the HDO, HDW and HAD reactions are carried out in single phase. The purified and optionally pretreated feedstock is contacted with at least one hydrodeoxygenation catalyst, at least one hydrodewaxing catalyst and at least one hydrodearomatization catalyst in a first hydroprocessing step, to obtain a hydroprocessing product, in the presence of hydrogen, in a hydroprocessing reactor system. It is to be noted that the single phase treatment does not mean that the catalyst beds are packed in a single reactor but they can also be placed in separate reactors arranged in series. In the embodiment where the hydroprocessing is carried out in one step, the HDA catalyst is selected from sulfidized metal catalysts and sulphur tolerant acid promoted noble metal catalysts, such as NiMo, CoMo, and catalysts containing Co or Ni. Suitably the HDA catalyst beds are located in the same reactor and/or in the same pressure vessel.

According to another embodiment, the hydroprocessing is performed in at least two steps. The purified and optionally pretreated feedstock is contacted with at least one hydrodeoxygenation catalyst and at least one hydrodewaxing catalyst in a first hydroprocessing step, and with at least one hydrodearomatization catalyst in a second hydroprocessing step to obtain a hydroprocessing product, in the presence of hydrogen, in a hydroprocessing reactor system. In said embodiment suitably at least two pressure vessels and/or reactors are used. In the first hydroprocessing step the purified and optionally pretreated feedstock is subjected to hydroprocessing in the presence of the HDO and HDW catalysts, and the obtained product, which may comprise a gaseous fraction comprising $H_2$, CO, $CO_2$, $H_2S$, $H_2O$ and light gaseous components and an effluent, or at least one fraction of said product, is subjected in the second hydroprocessing step to hydroprocessing in the presence of the HDA catalyst.

Suitably, in the first hydroprocessing step the hydroprocessing phase comprises at least one catalyst bed comprising a combination of at least one HDO and at least one HDW catalysts, or two or more catalyst beds comprising combinations of HDO and HDW catalysts or catalysts beds comprising HDO catalysts and catalyst beds comprising HDW catalysts, or combinations of any of said catalyst beds, and in the second hydroprocessing step the hydroprocessing phase comprises at least one catalyst bed comprising at least one HDA catalyst, or two or more catalyst beds comprising combinations of HDA and HDW catalysts, or combinations of any of said catalyst beds.

Alternatively, in the two step hydroprocessing embodiment the HDO and HDW treated product obtained from the first hydroprocessing step is subjected to fractionation, such as distillation, and one or more of the fractions, suitably boiling in the diesel range (160-380° C.), obtained from said fractionation is subjected to hydroprocessing in the second hydroprocessing step in the presence of the HDA catalyst.

In the two step hydroprocessing, optionally comprising the fractionation step before carrying out the hydroprocessing in the second hydroprocessing step in the presence of the HDA catalyst(s), a wider range of the above mentioned HDA catalysts may be used alone or in combinations.

The hydroprocessing steps are highly exothermic reactions in which the temperature can rise to a level which is detrimental to the stability of the catalyst and/or product quality. In some cases, it may be necessary to control the temperature variations particularly in the catalyst beds. Recirculation of the heavy residue obtained from the fractionation, and at least a portion of the hydrocarbon product stream and effluent gas provide an efficient means for constraining the exothermic reaction whereby the recycled liquid and gas streams act as media for lowering the temperature of the catalyst beds in a controlled manner.

According to one embodiment the heavy residue obtained from the fractionation in the one step hydroprocessing is recycled to the feed to the hydroprocessing step.

According to another embodiment the heavy residue obtained from the fractionation after the first hydroprocessing step in the two-step hydroprocessing is recycled to the feed to the first hydroprocessing step.

Additionally the hydrocarbon product may be directed for quench purposes between one or more catalyst beds.

In an embodiment of the invention the light gases and/or gaseous fractions separated at one or more locations of the process are directed to an amine scrubber, which removes $H_2S$ and $CO_2$ from the gaseous products. The scrubbed gases, comprising mainly hydrogen and some impurities, may be recycled to the process as feed hydrogen and quench gas.

The product from the hydroprocessing reactor system, or from the first hydroprocessing reactor in the case of two-step hydroprocessing, is drawn off from the bottom of the last reactor of the main reaction phase, from the outlet of the last main catalyst bed. In one embodiment of the invention the product is cooled and directed to a separator, such as any suitable separator or flashing unit. In the separator, water and light gases containing hydrogen, light hydrocarbons, $H_2S$, CO and $CO_2$ are separated from the liquid hydrocarbon product. Water and gases may also be separated by other means which are well known to those skilled in the art.

The reaction products, i.e. the hydrocarbon mixture from the separator are fed to fractionation unit, such as a separation column where different fuel grade hydrocarbon fractions are recovered. From the bottom of the separation column, the heavier hydrocarbons may also be recycled back to the inlet end of the hydroprocessing reactor system and mixed into the feed to the hydroprocessing reactor or to the first hydroprocessing reactor, suitably before the guard beds or guard bed reactors.

The person skilled in the art is able to vary the distilling conditions and to change the temperature cut point as desired to obtain any suitable hydrocarbon product.

In the case of the two-step hydroprocessing, a fraction, suitably diesel fraction is directed to the second hydroprocessing reactor for hydroprocessing in the presence of a catalyst comprising a HDA catalyst.

The recovered middle distillate fraction may comprise gas oil, i.e. a hydrocarbon fraction having a boiling point in the diesel range. A typical boiling point is from 160° C. to 380° C., meeting characteristics of the specification of EN 590 diesel. The diesel product may be fed to a diesel storage tank and the lighter hydrocarbons may be directed to a stabilizer, where a naphtha fraction can be recovered. Also hydrocarbon fractions distilling at temperatures ranging from ambient (or 40° C.) to 210° C. and at a temperature of about 370° C. can be recovered. These fractions are useful as high quality gasoline fuel and/or naphtha fuel, or as blending components for these fuels.

In order to function and stay active particularly the HDO and HDW catalysts used in the present invention need organic sulphur. Therefore when the feed to the hydroprocessing does not in itself contain sulphur or its sulphur concentration is too low, additional sulphur is fed to the step of hydroprocessing. The additional sulphur can be fed to the hydroprocessing step together with the feed or it can be fed separately to the hydroprocessing step. Additional sulphur can be supplied to the process in gaseous form like hydrogen sulphide, or it can be any material that produces hydrogen sulphide in the process, like organic sulphur compounds, such as dimethyl disulphide. The amount of additional sulphur depends on the amount of sulphur contained in the feed. A person skilled in the art is able to determine the amount of needed sulphur without undue burden. Generally, the sulphur content in the feed is suitably maintained at the level of 200-300 ppm, calculated as sulphur.

The catalyst contained in the reactors of the present invention can be in any suitable form. The catalyst used in the present invention can be diluted with silicon carbide, aluminum oxide, glass beads, less active catalyst and/or inert material. The catalyst used in the present invention can also be undiluted. The catalyst can be in catalyst bed and the bed can be graded by adjusting the activity, particle shape and/or size of the used catalyst. The diluting and grading of the catalyst help in controlling the exothermic balance of the reaction.

The hydroprocessing can be carried out in any kind of reactor, column, vessel, container, tube or pipe, which is suitable for hydroprocessing.

The hydroprocessing is carried out at a temperature range of about 150-500° C. When the hydroprocessing is carried out as a one-step process the temperature is 250-400° C., suitably 290-390° C. When the hydroprocessing is carried out as a two-step process the temperature in the first hydroprocessing step is 280-450° C., suitably 330-430° C. and the temperature in the second hydroprocessing step is 150-400° C., suitably 180-350° C.

The hydroprocessing is carried out under a pressure of 5-200 bar. When the hydroprocessing is carried out as a one-step process the pressure is 20-180 bar, suitably 50-150 bar. When the hydroprocessing is carried out as a two-step process the pressure in the first hydroprocessing step is 50-180 bar, suitably 70-120 bar and the pressure in the second hydroprocessing step 5-110 bar, suitably 10-90 bar.

The feed is pumped to the hydroprocessing reactor at a desired speed. Feed rate LHSV (liquid hourly space velocity) of the feed material is typically in the range of 0.01-10 h$^{-1}$, suitably 0.1-5 h$^{-1}$.

The amount of hydrogen gas needed is determined by the amount of feed. The suitable amount of hydrogen can be determined by a person having ordinary skills in the art. Typically, the relation H$_2$/feed is in the range of from about 350 to 4000 Nl/l, preferably from about 500 to 3600 Nl/l. (Nl=Normal liter).

According to an embodiment of the present invention the gaseous compounds separated from the liquid compounds are hydrogen gas, hydrogen sulphide, light fuel gases, mainly lighter than C5 hydrocarbons.

The process of the present invention can be realized in any typical apparatus for producing biofuel or biofuel components, which includes the specific catalyst bed(s) of the invention. An apparatus adapted for realizing an embodiment of the process of the invention comprises a catalytically active pretreatment (guard bed) phase and main reaction phase. According to one embodiment at least one of said phases comprises a catalyst bed, in which HDO and HDW catalysts are combined with each other and HDA catalyst is located in a separate catalyst bed. In an embodiment of the invention, the HDO and HDW catalysts are mixed with each other either by physical mixing of catalyst particles or by providing both types of catalysts on the same support material.

A main reaction phase for use in the hydrodeoxygenation, hydrodewaxing and hydrodearomatizing process of the invention may comprise inert layers and trap layers for distributing the flow and/or trap impurities in addition to the active catalyst bed(s) with a combination of HDO and HDW and HDA catalysts.

Between the active catalyst beds there may be provided inlets for the introduction of cooling quench gas between the beds. Quench gas may also be introduced into the active bed(s).

Even though the middle distillate of the process might not always meet all the EN 590 specifications, a fuel product meeting most of the specifications can be produced by the process. Thus, the process produces paraffinic fuel or fuel components which is/are similar to EN 590 diesel and which has/have low aromatic content, even below 5 w-% and suitably below 1 w-%, high cetane rating (number), even more than 60 and acceptable cold flow properties.

Feedstocks of biological origin and mixtures thereof, comprising high amounts of aromatic compounds and/or cyclic structures containing unsaturated bonds can be converted in an efficient way to hydrocarbons comprising very low amounts of aromatic compounds, with high yields. As typically cracking is limited in this process the content of the more valuable C5+ hydrocarbons in the liquid hydrocarbon product is high and the amount of less valuable C1-C5 compounds is low.

Further, as in the present invention the HDA catalyst is selected from sulphur tolerant dearomatization catalysts and sulphur tolerant isomerization catalysts and their combinations, no sulphur removal is needed between HDO/HDW catalysts beds or reactors and catalyst beds or reactors comprising the HDA catalyst.

FIG. 1 is a schematic diagram of a process in accordance with one embodiment of the invention. In this embodiment, feedstock 1 comprising material of biological origin is subjected to purification treatment in a purification unit 20, such as an evaporation unit. Heavy evaporation residue 2 and light components and gases 3 are separated and the purified feedstock 4 is directed to pretreatment and hydroprocessing in hydroprocessing reactor system 30. In this embodiment said reactor system comprises at least one guard bed followed by at least one combined HDO/HDW catalyst bed, followed by at least one HDW catalyst bed, followed by at least one HDA catalyst bed, under conditions suitable for effecting the hydroprocessing reactions. Fresh hydrogen 5, combined with recycled hydrogen 15, is introduced to the purified feed 4 and optionally as stream 6 to one or more catalyst beds (not shown in the figure) in the hydroprocessing reactor system 30. Water 14, and gaseous components and light compounds 16 are separated from the hydroprocessing product 7 in separator 40. The gaseous components are purified (not shown in the figure) for removing at least part of undesired contaminants, such as H$_2$S, CO$_2$ and/or light hydrocarbons, and hydrogen 15 together with fresh hydrogen 5 is recycled to the hydroprocessing reactor system 30. If desired, light compounds may also be recycled (not shown in the figure) to the hydroprocessing reactor system 30. The separated liquid hydrocarbon product 8 is directed to fractionation in a fractionation unit 50 where fractions boiling in the liquid fuels ranges and containing low aromatics content (diesel 9, naphtha 10, and light gas oil 11) are obtained. At least part of the heavy fractionation residue 12 is recycled to the feed 4, optionally also between catalyst beds in the hydroprocessing reactor system 30 (not shown in the figure).

Figure 2:
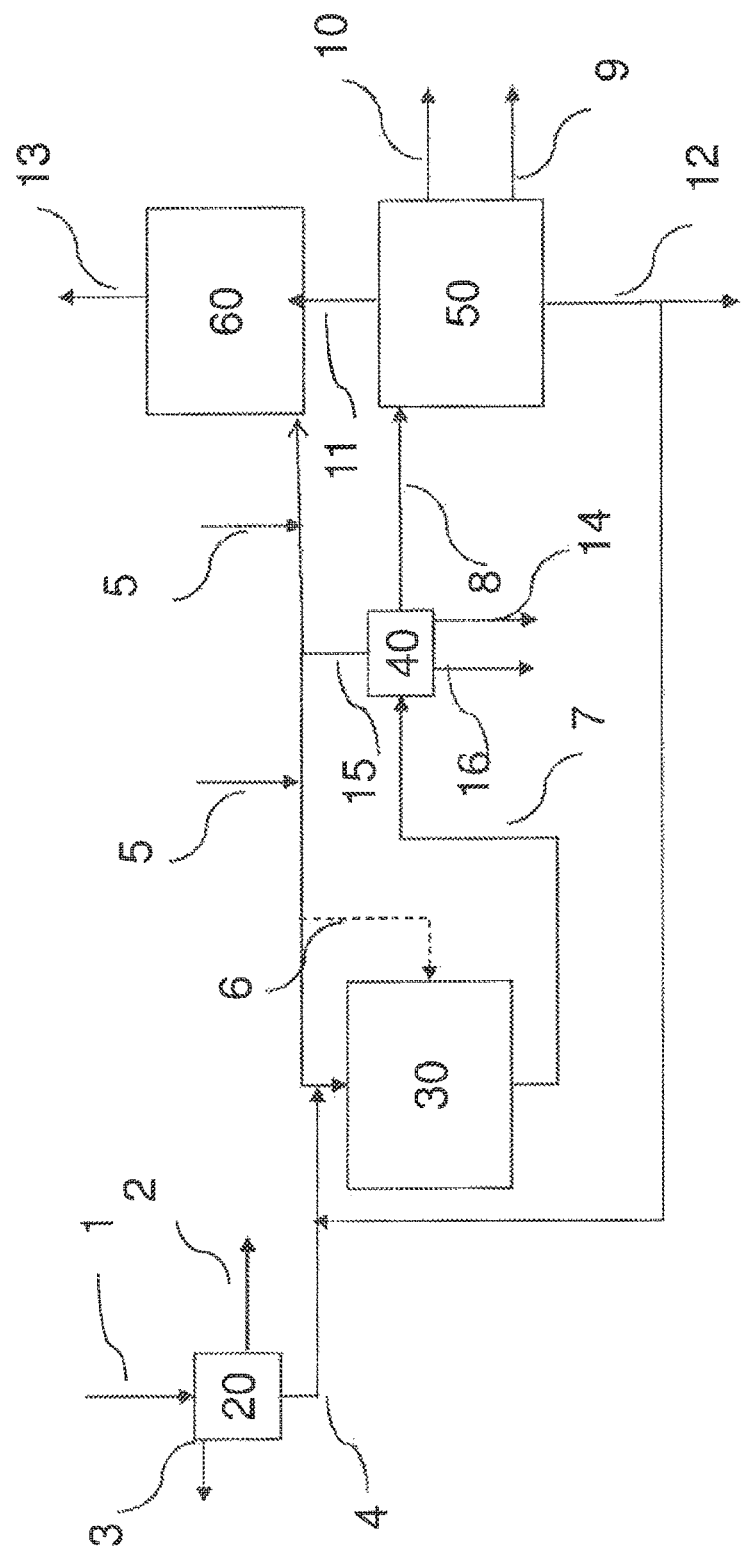
FIG. 2 is a schematic flow diagram representing another embodiment of process of the invention where a feedstock is subjected to purification, followed by pretreatment with guard bed/guard beds and HDO/HDW treatment in a first hydroprocessing reactor system, separating hydrogen for recycling and liquid product, which is subjected to fractionation to obtain a diesel fraction, and said diesel fraction is subjected to HDA treatment in a second hydroprocessing reactor system.

FIG. 2 is a schematic diagram of a process in accordance with another embodiment of the invention. In this embodiment, feedstock 1 comprising material of biological origin is subjected to purification treatment in purification unit 20, such as an evaporation unit. Heavy evaporation residue 2 and light components and gases 3 are separated and the purified feedstock 4 is directed to pretreatment and hydroprocessing in a first hydroprocessing reactor system 30. In this embodiment said reactor system comprises at least one guard bed followed by at least one combined HDO/HDW catalyst bed, followed by at least one HDW catalyst bed, under conditions suitable for effecting the hydroprocessing reactions of the first hydroprocessing step. Fresh hydrogen 5, combined with recycled hydrogen 15, is introduced to the purified feed 4 and optionally as stream 6 to one or more catalyst beds (not shown in the figure) of the first hydroprocessing reactor system 30. Water 14, and gaseous components and light compounds 16 are separated from the hydroprocessing product 7 in separator 40. The gaseous components are purified (not shown in the figure) for removing at least part of undesired contaminants as $H_2S$, $CO_2$ and/or light hydrocarbons, and hydrogen 15 together with fresh hydrogen 5 is recycled to the hydroprocessing reactor system 30. Is desired, light compounds may also be recycled (not shown in the figure) to the first hydroprocessing reactor system 30. The separated liquid hydrocarbon product 8 is directed to fractionation in a fractionation unit 50 where fractions boiling in the liquid fuel ranges (diesel 11, naphtha 10, heavy residue 12 and light gas oil 9) are obtained. At least part of the heavy fractionation residue 12 is recycled to the feed 4, optionally also between catalyst beds (not shown in the figure) in the first hydroprocessing reactor system 30. The diesel fraction 11 and hydrogen 5 are directed to a second hydroprocessing reactor system 60 comprising at least one HAD catalyst bed, under conditions suitable for effecting the hydroprocessing reactions. A liquid hydrocarbon product 13, containing low aromatics content is obtained.

The following example is an illustrative of embodiments of the present invention, as described above, and it is not meant to limit the invention in any way. The invention is illustrated also with reference to the figures.

EXAMPLES

Example 1

Crude tall oil was subjected to hydroprocessing in a first hydroprocessing reactor loaded with a mixed catalyst bed comprising (HDO/HDW) NiMo and NiW catalysts on an $Al_2O_3$—$SiO_2$ support. The processing was carried out at 350-360° C. temperature, under a pressure of 90 bar, LHSV was 0.2 $h^{-1}$, and $H_2$/oil ratio was 1500 $Nl(H_2)/l$ feed. A sample was taken from the hydrorocessing effluent, which was fractionated to obtain a fraction boiling in the diesel range. The diesel fraction contained 5% by weight of aromatic compounds. The further hydroprocessing of the effluent, spiked with DMDS, was carried out in a second (HDA) hydroprocessing reactor loaded with a catalyst bed comprising a sulphided NiMo catalyst on an $Al_2O_3$—$SiO_2$ support. The processing was carried out at 300° C. temperature, under a pressure of 90 bar, LHSV was 1 $h^{-1}$, and $H_2$/oil ratio was 300 $Nl(H_2)/l$ feed. The product contained 0.6% by weight of aromatics, and hardly no yield losses were noticed, due to low process temperature where no cracking occurred.

The present invention has been described herein with reference to specific embodiments. It is, however clear to those skilled in the art that the process(es) may be varied within the bounds of the claims.

The invention claimed is:

1. A process of converting feedstock comprising materials of biological origin into hydrocarbons, said process comprising the steps of:
   providing feedstock comprising at least one material of biological origin;
   subjecting the feedstock to purification treatment to obtain purified feedstock;
   providing molecular hydrogen;
   hydroprocessing the purified feedstock in the presence of at least one hydrodeoxygenation catalyst, at least one hydrodewaxing catalyst and at least one hydrodearomatization catalyst to obtain a hydroprocessing product,
   wherein the hydrodeoxygenation catalyst catalyzes removal of heteroatoms, the hydrodewaxing catalyst catalyzes hydrodeoxygenation, hydrogenation, isomerization, ring-opening, and cracking, and the hydrodearomatization catalyst catalyzes converting aromatic compounds to non-aromatic compounds.

2. The process according to claim 1, wherein the hydroprocessing is carried out in one step or in more than one steps.

3. The process according to claim 1, wherein the purification treatment comprises at least one purification step selected from the group consisting of filtration, degumming, bleaching, solvent extraction, hydrolysis, ion-exchange resin treatment, mild acid wash, evaporative treatment, and any combination thereof.

4. The process according to claim 1, wherein the purification treatment is evaporative treatment carried out in an evaporation unit comprising at least one evaporator.

5. The process according to claim 1, wherein the purified feedstock is subjected pretreatment carried out using supercritical extraction technology or with one or more guard beds.

6. The process according to claim 5, wherein the guard beds are selected from the group consisting of active guard beds, inactive guard beds, and their combinations.

7. The process according to claim 1, wherein the hydroprocessing is carried out at a temperature of 150-500° C.

8. The process according to claim 1, wherein the hydroprocessing is carried out under a pressure of 5-200 bar.

9. The process according to claim 1, wherein the hydroprocessing is carried out in one step, in the presence of hydrogen in a hydroprocessing reactor system and the hydroprocessing temperature is 250-400° C.

10. The process according to claim 9, wherein the hydroprocessing is carried out under the pressure of 20-180 bar.

11. The process according to claim 1, wherein the hydroprocessing is carried out in a hydroprocessing reactor system comprising at least two catalyst beds, where the first catalyst bed comprises a combination of HDO and HDW catalysts, and the second catalyst bed comprises HDA catalyst(s).

12. The process according to claim 1, wherein the hydroprocessing is carried out in a hydroprocessing reactor system comprising three or more catalyst beds, where the first catalyst bed(s) comprises a HDO catalyst or a combination of HDO and HDW catalysts, the second catalyst bed(s) comprises a HDW catalyst(s) and the third catalyst bed(s) comprise a HDA catalyst(s).

13. The process according to claim 11, wherein the HDA catalyst bed comprises a HDW catalyst.

14. The process according to claim 1, wherein the hydroprocessing is carried out in a hydroprocessing reactor system comprising three or more catalyst beds, where HDO, HDW and HDA catalysts are located each in separate catalysts beds.

15. The process according to claim 1, wherein the hydroprocessing is carried out in two steps and the temperature in the first hydroprocessing step is 280-450° C., and the temperature in the second hydroprocessing step is 150-400° C.

16. The process according to claim 15, wherein the hydroprocessing is carried out in two steps and the pressure in the first hydroprocessing step is 50-180 bar, and the pressure in the second hydroprocessing step 5-110 bar.

17. The process according to claim 1, wherein in the first hydroprocessing reactor system in the first hydroprocessing step comprises at least one catalyst bed comprising a combination of HDO and HDW catalysts, or two or more catalyst beds comprising combinations of HDO and HDW catalysts or catalysts beds comprising HDO catalysts and catalyst beds comprising HDW catalysts, or combinations of said catalyst beds, and in the second hydroprocessing step the hydroprocessing reactor system comprises at least one catalyst bed comprising a HDA catalysts, or two or more catalyst beds comprising combinations of HDA and HDW catalysts, or combinations of said catalyst beds.

18. The process according to claim 1, wherein after the hydroprocessing or after the first hydroprocessing step a hydroprocessing product is subjected to fractionation to obtain hydrocarbon fractions boiling in the liquid fuel ranges and a heavy residue.

19. The process according to claim 18, wherein at least one of said fractions is subjected to the second hydroprocessing step on the presence of at least one HDA catalyst.

20. The process according to claim 18, wherein the at least part of a heavy residue, is recycled to the purified feedstock.

21. The process according to claim 1, wherein the HDO catalyst comprises at least one metal selected from the group consisting of NiMo, CoMo, and mixtures of Ni, Mo and Co, and at least one support selected from $Al_2O_3$, $SiO_2$, $ZrO_2$, and mixtures thereof.

22. The process according to claim 1, wherein the HDO catalyst is selected from the group consisting of NiMo/$Al_2O_3$, NiMo/$SiO_2$, CoMo/$Al_2O_3$, CoMo/$SiO_2$NiMoCo/$Al_2O_3$ and, NiMoCo/$SiO_2$.

23. The process according to claim 1, wherein the HDW catalyst comprises at least one metal selected from the group consisting of Group VI and/or VIII of the Periodic System and mixtures and combinations thereof, and a support selected from the group consisting of aluminosilicate molecular sieve, zeolites and oxides.

24. The process according to claim 1, wherein the HDW catalyst is NiW on a support selected from the group consisting of $Al_2O_3$, zeolite, zeolite-$Al_2O_3$, and $Al_2O_3$—SiO.

25. The process according to claim 1, wherein the HDA catalyst is selected from the group consisting of catalysts containing metals of the Group VIII of the Periodic table of Elements, Group VIB, and the rare earth metals, on a support selected from the group consisting of oxide supports, carbon, charcoal, zeolites, and combinations thereof.

26. The process according to claim 1, wherein the HDA catalyst is selected from the group consisting of catalysts containing metals selected from the group consisting of Pt, Pd, Ir, Ru, Rh, Re, Ni, Co, Mo, W, CoMo, NiMo, and NiW, on a support.

27. The process according to claim 24, wherein the HDW catalyst is NiW/$Al_2O_3$ or NiW/zeolite/$Al_2O_3$.

28. The process according to claim 26, wherein the HAD catalyst is selected from the group consisting of metal sulphides, Pd and/or Pt on zeolite Y/$Al_2O_3$, Pd and/or Pt on zirconia/silica, Pd and/or Pt on alumina/alumina-silica, Pd or Pt or Ir on carbon, or charcoal, Pd, Pt, Ir, Ru, Rh and/or Re on silca/alumina, sulphidized CoMo and NiMo catalysts on alumina/alumina-silica; and Pd—Pt on $Al_2O_3$—$B_2O_3$.

29. The process according to claim 4, wherein the evaporation unit comprises three or four evaporators.

30. The process according to claim 9, wherein the hydroprocessing temperature is 290-390° C.

31. The process according to claim 10, wherein the hydroprocessing is carried out under the pressure of 50-150 bar.

32. The process according to claim 15, wherein the temperature in the first hydroprocessing step is 330-430° C., and the temperature in the second hydroprocessing step is 180-350° C.

33. The process according to claim 16, wherein the pressure in the first hydroprocessing step is 70-120 bar, and the pressure in the second hydroprocessing step is 10-90 bar.

* * * * *